INVENTOR
CHARLES W. ROSS

United States Patent Office 3,419,772
Patented Dec. 31, 1968

3,419,772
PROBABILISTIC AND DETERMINISTIC FILTER FOR CONTROL SYSTEMS
Charles W. Ross, Hatboro, Pa., assignor to Leeds & Northrup Company, Philadelphia, Pa., a corporation of Pennsylvania
Filed Sept. 25, 1964, Ser. No. 399,216
14 Claims. (Cl. 318—18)

ABSTRACT OF THE DISCLOSURE

A control system in which the response of the manipulated variable to the error signal is modified when the error signal exceeds a predetermined limit for a predetermined time period or when the error signal as modified by its integral exceeds that limit and time period. In one arrangement, a plurality of limit values may be established with each having an associated time period while in another arrangement the time period may be a continuous function of the error signal. Thus, the response can be varied in several steps as the error signal increases.

---

This invention relates to an improvement for process control systems for minimizing the possibility of the control taking action which would not be of sufficient significance or effectiveness to be justified for the process being controlled or which might tend to cause instability in the system.

Control systems are frequently used to control processes which are themselves incapable of responding at a rate sufficient to make possible an effective reduction of certain types of deviations such as those of short duration. These transient deviations are therefore generally characterized as noise signals. They may be of a random nature with frequent changes in polarity, or they may be somewhat regular periodic responses to a particular, but known, disturbance in the process. Also, they may be of known character but nevertheless random in occurrence.

When the process is such that random noise signals are encountered it may be desirable to have the control respond to them with reduced gain if they are not amenable to being corrected with sufficient rapidity to take advantage of the controller gain which is needed for correcting the larger or long term deviations in the same process.

Attempts to control random deviations which are of a short duration, particularly when those deviations are also small in magnitude, frequently serves only to introduce into the control system not only an ineffective control action but one which tends to cause instability. This may be the case when, for example, the response of the process to the control action called for by those noise signals occur after the deviation has completely disappeared or after an opposite change in the measured variable has occurred. In such cases the control instead of reducing the deviation would in fact operate to enhance it.

A similar problem exists where the process involves a periodic change such as a load change which occurs at somewhat regular intervals and has a predetermined wave shape. The period of the change and its magnitude may be such that the controller gain which is required for correcting other load changes may be excessive or undesirable. It is, therefore, an object of this invention to provide an improved method and means for process control.

A further object of this invention is the provision of a method and means of control which will reduce the response to those changes which are not correctable with a normal response.

It is a further object of this invention to provide a filtering circuit for a process control system which will filter out small errors which are of short duration.

A still further object of this invention is the provision of a filter circuit which will allow a full control response only to error signals which exceed a predetermined minimum value for a certain predetermined period without at the same time allowing error signals of smaller value to remain uncorrected for a long period of time.

It is a further object of this invention to provide a filter circuit which will cause the control system response to vary as necessary to maximize the response of the control system to large sustained error signals without introducing undesired control action when small and short duration error signals occur.

In accordance with this invention there is provided a method and means for effecting an improved process control by the incorporation of a filter circuit for establishing a plurality of predetermined conditions each of which represents a different combination of a predetermined magnitude of the error signal which must be continuously exceeded for a predetermined associated time before the process control can be modified to provide a normal or full response. The filter circuit is connected to the control system so as to modify the response of the control system to deviations which do not exceed the predetermined magnitude or limit value for a predetermined time period, where the predetermined limit value and the time period are determined by the response characteristics of both the process and the control system and also by the character of the disturbances to which the process is subjected. The modification of the control signal is of such a character as to either reduce or eliminate the response to deviations which have not exceeded the predetermined limit values for the predetermined time period. For certain processes the filter circuit may incorporate several parallel sections each having its own predetermined limit value and predetermined time period so that the response of the control system can be varied in several steps in accordance with the magnitude of the disturbances being controlled, or it may incorporate one section only if the time period is varied with the magnitude of the error signal.

The filter means may also incorporate the means for preventing the measured variable from deviating from its desired value for a long period of time even by a small magnitude.

For a more detailed understanding of the invention reference is made to the drawings in which.

Figure 1:
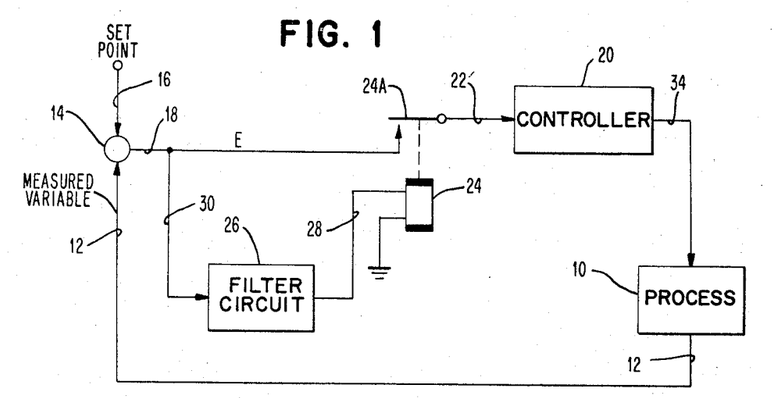
FIG. 1 is a block diagram showing one way in which the filter circuit may be incorporated in a process control system.

With reference to FIG. 1, the process 10, which is to be controlled, is shown as having a line 12 for carrying a signal produced in accordance with the magnitude of the measured value of the variable of the process to be controlled. For the present description this variable will be known as the measured variable or the controlled variable. The signal on line 12 is introduced to a summing point 14 where it is compared with a signal on line 16 whose magnitude is in accordance with a preset desired value for the measured variable, namely, the set point. The difference between the magnitude of the measured variable and the magnitude of the set point is represented by an error signal E which appears as an output from summing point 14 on line 18. It is normally desirable that this error signal should be reduced to a value as close to zero as possible by the operation of the associated control system 20.

The error signal E on line 18 is introduced as an input to controller 20 through relay contact 24A of relay 24 and input line 22 when relay 24 is energized. Relay 24 is energized by any output signal from filter circuit 26 which output signal appears on line 28 and is connected to energize the operating coil of relay 24. The operating coil is also shown as having one of its leads connected to a ground connection. The filter circuit 26 has its input line 30 connected to line 18 so that the input to the filter is the error signal E.

Figure 3:
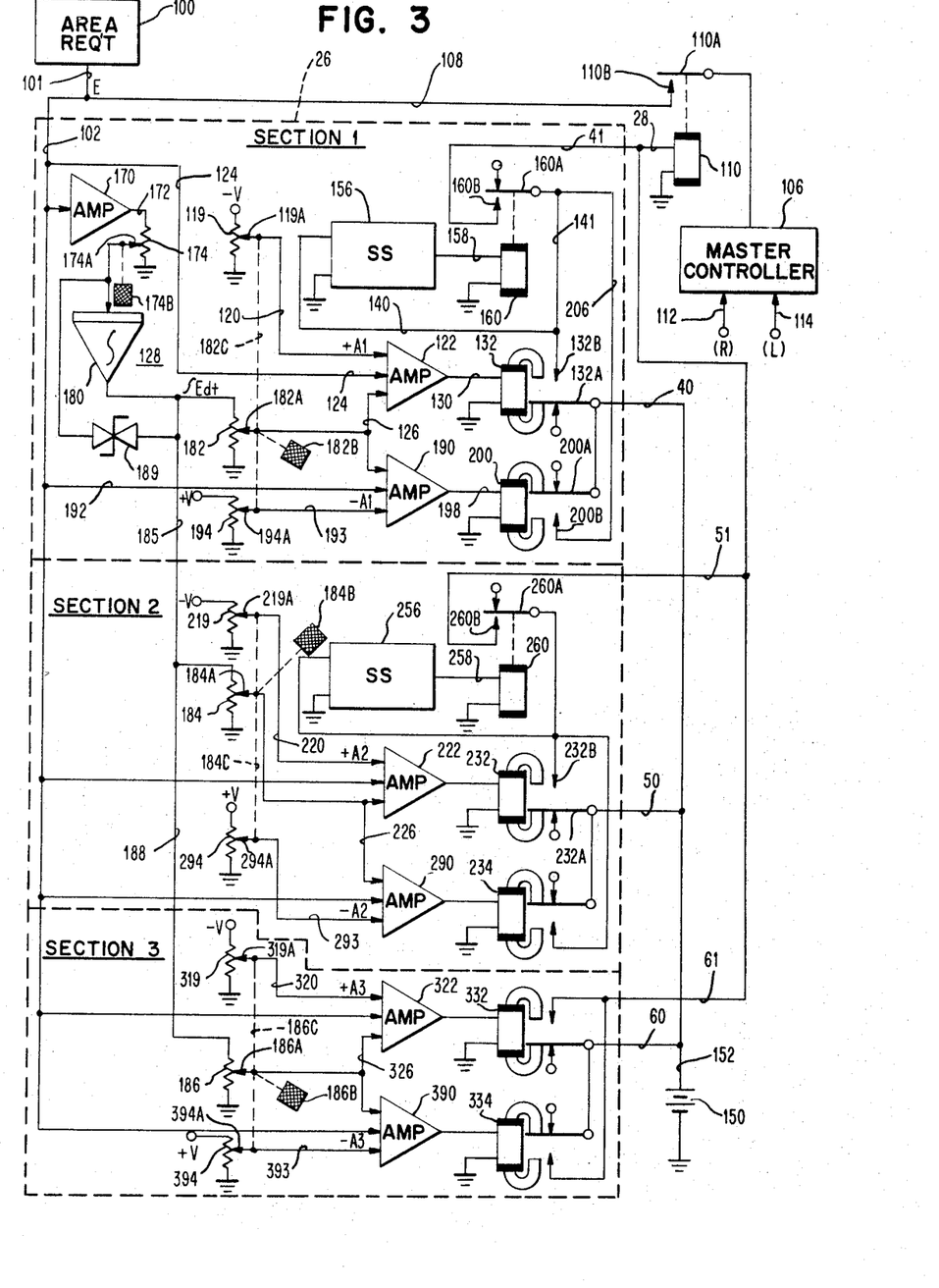
FIG. 3 is a schematic drawing of one form of a multisection filter circuit showing its application to a particular type of process control system.

In accordance with one form of this invention, as further explained with regard to the detailed drawing of FIG. 3, the filter circuit 26 may be designed so that an output signal on its output line 28 occurs only when the error signal as introduced on its input line 30 exceeds a predetermined limit value for a predetermined period of time. Upon such an occurrence the relay 24 is actuated to complete the control loop by closing contact 24A on the associated stationary contact to allow the controller 20 to respond to the error signal E which is then being supplied through line 18. The controller may, of course, be any of a number of standard type controllers depending upon the type of process which is to be controlled, the controller being effective to produce at its output connection 34 a signal which will alter the manipulated variable of the process 10 so as to tend to maintain the error signal E at a minimum or zero value and thereby tend to hold the measured variable of the process to its desired value.

Figure 2:
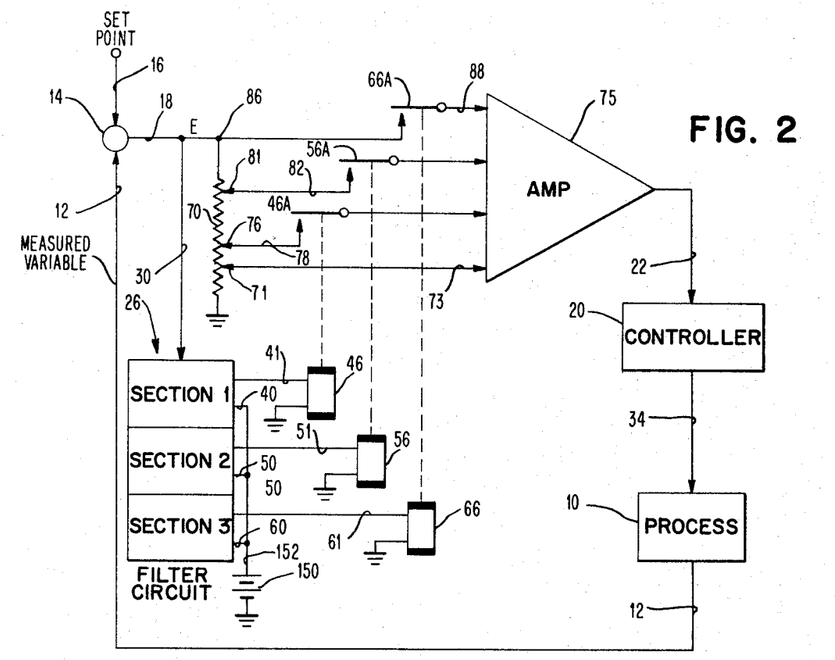
FIG. 2 is a block diagram showing a process and its associated control system and a modified way of incorporating the filter circuit in accordance with this invention.

In FIG. 2 there is shown an alternative method of applying the filter circuit 26 to process control. In FIG. 2 the filter circuit 26 may be considered as being made up of three different sections each of which sets up a predetermined condition for the error signal, these conditions each representing a different combination of its own predetermined limit value and its own predetermined time period during which the associated limit value must be continuously exceeded by the error signal before a modification of the control response is produced. Thus, the first section of the filter circuit will have an output circuit comprised of output lines 40 and 41 which are effective to connect by way of line 152 a source 150 to energize relay 46 to close the relay contact 46A on its associated stationary contact whenever the error E exceeds the predetermined limit value set for the first section for the predetermined time period set for that section.

Similarly, the second section of the filter circuit has output lines 50 and 51 connecting source 150 to energize relay 56 to close relay contact 56A on its associated stationary contact whenever the predetermined limit value for the second section has been exceeded for the time duration set for that section.

A third section of the filter 26 is shown as having output lines 60 and 61 connecting source 150 so that it will energize relay 66 to close relay contact 66A on its associated stationary contact whenever the predetermined limit value for the third section has been exceeded for its set time duration.

As will be evident from a further description of the filter circuit 26 in connection with FIG. 3, the predetermined time period which is associated with each of the sections of the filter will generally be unique to that stage. The longest time duration may, for example, be advantageously associated with section 1, the section having the lowest limit value. The next shorter time duration will be generally associated with the section having the next higher limit value. The shortest time duration will generally be associated with the highest limit value. With such an arrangement the circuit of FIG. 2 is effective to increase the gain of the control system as the measured variable deviates further from its setpoint with the larger deviations being required for shorter time duration before the change in gain is effected.

It will be evident from FIG. 2 that the error signal E on line 18 energizes the tapped resistor 70 which has one end connected to line 18 and its other end connected to ground. This resistor has its lowest tap 71 connected by line 73 to one input to operational amplifier 75. Tap 71 is shown as being located on resistor 70 so that the effective gain of the control system has a value .1, in other words one-tenth of the maximum gain of this particular control system. In FIG. 2 the controller gain of .1 is always effective since the line 73 is never broken. Thus, regardless of the magnitude of the error E the control system is effective to tend to reduce that error by changing the manipulated variable of the process 10 an amount which is 1/10 of the maximum response which is available from the control system.

A second tap on resistor 70, namely, tap 76 is connected through line 78 and relay contact 46A to another input of summing amplifier 75 when relay 46 is energized. The tap 76 is shown positioned so that it represents a gain value of .2 in addition to the gain value associated with tap 71.

Still another tap 81 on resistor 70 is connected through line 82 and relay contact 56A to a third input to amplifier 75 when relay 56 is energized. The tap 81 also is positioned to have a gain value of .2 in addition to the gain for those taps previously mentioned.

A maximum gain of one is produced by the connection of the taps 71, 76 and 81 to amplifier 75 along with the connection by way of relay contact 66A of tap 86 to amplifier 75 by way of line 88 when relays 46, 56 and 66 are all energized. Tap 86 thus adds .5 to the gain factors of the other taps.

From FIG. 2 it will be evident that energization of relay 46 by the first section of filter 26 will be effective to change the gain of the control system from .1 to .3 if there is no output from the other sections of filter 26. A similar change would be affected by an output from the second section only to energize relay 56, while an output from the third section only to energize relay 66 would be effective to change the gain from .1 to .6. When there is an output from each of the three sections of filter 26 all of the relay contacts 46A, 56A and 66A are closed on their stationary contacts and a maximum gain of 1 is effective for the control system.

While FIG. 1 has illustrated that the filter circuit 26, which is outside of the control loop for the process 10, may be utilized to either connect or disconnect the error signal from the input to the controller 20, FIG. 2 illustrates that where the filter 26 is of the type which has a plurality of sections it is possible to utilize the filter circuit to vary the gain of the control system so that the process 10 is affected differently by controller 20, depending upon the magnitude and duration of the error signal E. The controls affecting the gain of the control system in FIG. 2 are shown as being external to the controller 20. For some of the standard types of controllers the gain may be readily adjusted by the switching of circuits internal to the controller 20.

One form which filter 26 of FIGS. 1 and 2 may take is shown in FIG. 3 where it is illustrated as being applied to a particular type of process. The particular type of process with which the arrangement of FIG. 3 is concerned is the process for generating electricity at power frequencies as by central power stations. This control of generation is known in the art as "load-frequency control." In one form, which has been utilized for many years, the generation of each of the generators in the different stations making up a power system is under the control of a centralized computing and control system. Such a computing and control system may, for example, be of the type shown and described in U.S. Patent No. 2,773,994 which was issued on Dec. 11, 1956 to Mr. N. Cohn. Particular reference may be had to FIG. 9 of that patent wherein the circuitry for obtaining the area requirement measurement is shown in detail and where it is also illustrated that the control is effected in response to "raise" and "lower" signals supplied by the master controller 78. In the present FIG. 3 the area requirement instrument 100 could desirably correspond to the area requirement instrument 19 of the above patent. Thus the output signal from the area requirement instrument 100 on line 101 and the connected lines 102 and 108 varies in accordance with the change in load required for the generators in the associated area to maintain the desired frequency and any predetermined interchange with other connected areas. The signal on line 102 is thus an error signal such as error signal E of FIGS. 1 and 2 and it is desired to control the generation of the generators in the particular area in order to reduce that error signal to zero or at least to maintain that signal as close to zero as possible. As shown in the above referenced patent, a signal from the area requirement instrument is effective to operate a master controller which in FIG. 3 is shown as 106, the line 101 connecting through line 108, fixed relay contact 110B and the movable relay contact 110A of relay 110 to the master controller 106.

The master controller 106 may be constructed in any number of ways. It is only necessary that it produce "raise" (R) and "lower" (L) signals on the output lines 112 and 114, respectively. As illustrated in the Cohn patent, the "raise" and "lower" signals are utilized as a means for effecting control of the generation of the individual generators and the lines 112 and 114 may be considered as corresponding to lines 13C of FIG. 9 of the aforementioned Cohn patent.

In FIG. 3 the filter circuit 26 is shown as having three sections, namely, sections 1, 2 and 3. Referring to section 1, there is established a predetermined positive and negative limit value for the error signal E, here shown as having a value A1. The circuit of section 1 is so designed that the error value E must exceed either in a positive or a negative sense the absolute value of limit A1, as modified by the time integral of E, for a predetermined period of time T1 before there is produced on the output lines 40 and 41 an output signal calling for a change in the response of the control system by energizing relay 110 to connect the error signal to the input of controller 106.

The positive limit value +A1 is introduced as a signal of negative potential tapped from potentiometer 119 at tap 119A which is connected through input line 120 to relay amplifier 122. The potentiometer 119 is connected to a potential supply −V. Also introduced as inputs to amplifier 122 are the error signal E, which appears on line 124 by virtue of its connection to line 102, and a signal which is the time integral of the error signal. This latter signal appears on line 126 as an output of the integrating circuit 128. When the error signal on line 124 exceeds the limit signal on line 120 as that signal may be modified by the subtraction of the signal on line 126 there is produced on the output line 130 of amplifier 122 an actuating signal. The actuating signal on line 130 is effective to energize polarized relay 132, which has one terminal of its energizing coil connected to 130 and its other terminal connected to ground. Upon energizing polarized relay 132 its movable contact 132A is pulled into contact with its upper, fixed contact 132B. Upon contact between the contacts 132A and 132B the output line 40 is connected to line 140 and to line 141. Battery 150 will then be effective by virtue of the connection of its positive terminal to line 152 and its negative terminal to ground to cause current to flow through line 40, movable contact 132A, and fixed contact 132B to line 140. Line 140 is connected to the single-shot timer 156 which has its other input connection made to ground.

The single-shot timer 156 may be any one of a number of well known single-shot timers which produce at their output a signal which is delayed a predetermined time period T1 beyond the initiation of the signal on the input to the timer. For the present circuit it is desirable that the output of the timer be a continuous signal and that this signal should begin after there has been an input signal continuously for the predetermined set time period, the output signal continuing as long as the input signal is maintained. Output line 158 from single-shot timer 156 is connected to relay energizing coil 160 which has its other terminal connected to ground.

Upon energization of the relay coil 160 by the energizing signal on line 158, the movable contact 160A is pulled into contact with the lower fixed contact 160B so that line 141 is then connected to output line 41. This completes the connection of output lines 40 and 41 of stage 1. Upon the completion of that circuit battery 150 causes current to flow through line 152, line 40, movable contact 132A, stationary contact 132B, line 141, movable contact 160A, stationary contact 160B, line 41 and line 28 to energize relay 110 and pull movable relay contact 110A into contact with fixed contact 110B. The error signal E on line 101 is then connected through line 108 to master controller 106 which is effective in response to the error signal to change the generation of the area as required. When relay 110 is not energized the controller 106 is disabled and although the area requirement measured by instrument 100 changes that change is not effective to cause a change in generation. It will thus be evident that one condition under which there is an output from section 1 which is effective to change the response of the control is that condition in which the error signal E on line 102 exceeds for the time period T1 the predetermined limit value +A1 as that value may be modified by the time integral of E. Filter circuit 26 is thus effective to filter out both positive error signals which do not exceed the modified limit value A1 and also those positive errors which do exceed the modified limit value A1 for a time period less than that set on the single-shot timer 156.

Integration circuit 128 is responsive to the error signal E by virtue of its connection to line 102. Line 102 is shown as connected to the input of a sign changing amplifier 170 whose output on line 172 is across adjustable tapped resistor resistor 174 whose tap 174A may be set as by the knob 174B to establish the integration rate desired. The tap 174A is connected to the input to integrating amplifier 180 whose output is connected across an adjustable tapped resistor or potentiometer 182 for section 1. The integrating circuit 128 is common to all of the sections and separate adjustable tapped resistors are connected to its output, each being associated with a different section. Thus the adjustable tapped resistor 182 is associated with section 1 whereas the adjustable tapped resistor 184 is associated with section 2 and is connected by line 185 to the output of integrating amplifier 180. Likewise, adjustable tapped resistor 186 is connected by way of line 188 and 185 to the output of integrating amplifier 180 and is associated with section 3. Each of the resistors 182, 184 and 186 has its own separate adjustable tap 182A, 184A and 186A, respectively. These taps are adjusted by the associated knobs 182B, 184B and 186B so as to establish on lines 126, 226 and 326, respectively, signals representing different fractions of the time integral of the error signal. These signals, however, are limited to being of magnitude less than or equal to the appropriate limit value A1, A2 and A3. This limitation is accomplished by the introduction of Zener diodes 189 in shunt to integrating amplifier 180. Depending upon the breakdown voltage of Zener diodes 189, the tap 182A, for example, may be adjusted so that the maximum value of the signal on line 126 will either be equal to or less than the limit value +A1.

The establishment of a similar limit value −A1 for negative error signals appearing on line 102 is accomplished by circuitry similar to that shown for the positive limit value. Relay amplifier 190 is connected to receive an input on line 192 which is the error signal from line 102. Amplifier 190 is likewise connected by an input connection through line 193 to a signal source derived from the tapped potentiometer 194 which is connected to source +V and has its tap 194A connected to line 193 for establishing a potential representing the negative limit value −A1. The other input to amplifier 190 is from line 126. Amplifier 190 produces an actuating signal on its output line 198 whenever the error signal appearing on line 192 exceeds in a negative direction the limit signal −A1 on line 193 as that limit signal is modified by the integrated error signal on line 126. The actuating signal on line 198 is connected to energize the polarized relay 200 which has one terminal of its energizing coil connected to line 198 and the other connected to ground. The energization of the polarized relay 200 is effective to cause the movable contact 200A to be brought into contact with the lower fixed contact 200B thus connecting output line 40 to line 206. Line 206 is in turn connected to the input to the single shot timer 156 by way of lines 141 and 140. Therefore the energization of relay 200 is effective to establish current flow from source 150 through line 152, line 40, movable contact 200A, and stationary contact 200B, line 206, line 141 and line 140 to the input of the single shot timer 156. After the predetermined period of time T1 if relay 200 is still energized an energizing signal appears on output line 158 of the single shot timer 156 to energize relay 160 which will pull in the relay contact 160A to connect it with its lower stationary contact 160B, connecting line 41 and line 206, so that relay 110 is energized by battery 150. It will thus be evident that the existence of an error signal exceeding the limit value −A1, as modified by the integrated error signal on line 126, is effective if it exists for a period of time in excess of T1 to cause the master controller 106 to be connected to the area requirement instrument 100 so that the control is effective for changing the generation as previously mentioned.

Coordination of the adjustment of tap 182A by knob 182B with the adjustment of taps 119A and 194A is effected by way of the mechanical coupling 182C which serves to gang the settings of the potentiometers 119, 182 and 194.

Section 2 of the filter circuit of FIG. 3 is constructed to be similar to section 1, however, it shares with the other sections of the filter circuit the integrating circuit 128. Thus, relay amplifiers 222 and 290 are similar in design and function to amplifiers 122 and 190, respectively. In section 2, however, the limit values determined by the signals on lines 220 and 293 are shown as the values +A2 and −A2, respectively, and are equal in their absolute values although opposite in sign. These limit values may differ in their absolute value from the values of +A1 and −A1 in section 1.

The introduction of the integrated error signal into section 2 from the adjustable tap 184A on resistor 184 as adjusted by the knob 184B is effective to provide on the input line 226 to amplifiers 222 and 290 an integrated error signal which is adjusted to have a maximum value corresponding to A2. The mechanical coupling 184C, connected to knob 184B, coordinates the adjustment of taps 219A and 294A on potentiometers 219 and 294 which are respectively supplied from sources −V and +V.

In section 2 the polarized relays 232 and 234 correspond to relays 132 and 200 of section 1 and are connected in similar fashion to single shot timer 256 which is similar to timer 156. The output lines 50 and 51 are interconnected in similar fashion to 40 and 41 of section 1 except that in the case of section 2 the appropriate limit value is A2 and the appropriate time duration is that set into single shot timer 256, namely T2. This time duration will generally be a unique value which is smaller than that set into single shot timer 156.

Section 3 of the filter circuit of FIG. 3 is similar in all respects to sections 1 and 2 except that there is omitted from section 3 the single shot timer and its associated relay. Thus, the relay amplifiers 322 and 390 correspond to amplifiers 122 and 190 of section 1 with the preset limit value inputs being set at +A3 and −A3 by adjustment of the taps 319A and 394A on potentiometers 319 and 394 which are respectively connected to sources −V and +V. The signal on line 320 corresponds with the value +A3 and that on line 393 with the value −A3. Also, the integrated error signal on line 326 from adjustable tap 186A as adjusted by the knob 186B is limited to a value equal to A3 by mechanical coupling 186C connected to knob 186B.

In section 3 the energization of either one of the polarized relays 332 or 334, which are similar in design and function to 132 and 200, will be effective to complete the circuit from the source 150 through the energizing coil of relay 110 as soon as the error signal on line 102 exceeds the value A3 in either a plus or minus direction, as that value may be modified by the integrated error signal on line 326. There is no time duration during which such an error signal is required to be present before the control is made effective by the energization of relay 110 hence the single-shot timer such as is used in sections 1 and 2 is omitted.

Figure 4:
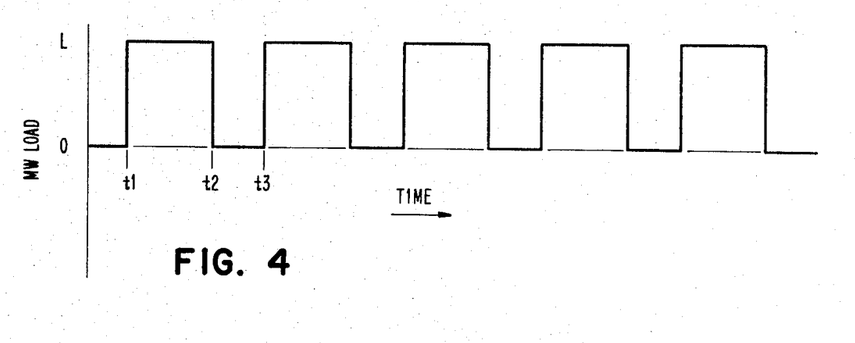
FIG. 4 is a waveform of one type of process disturbance.

The operation of the filter circuit of FIG. 3 in the control of processes may be best illustrated by considering specific process control problems. FIG. 4 is a waveform showing periodic variations of load of the type which may, for example, be expected in a power distribution system which has a rolling mill as one of its connected loads. Thus, each of the positive load changes illustrated in FIG. 4 may represent the duration of the rolling operation at which time a considerable amount of power is drawn from the distribution system. The period of time during which each of the rolling operations occurs may be of such a short duration that there would not be adequate time for the load frequency control to fully effect a change in generation of the generators to compensate fully for the load change. On the other hand even if the control could follow the load changes it might be desirable to minimize the number of changes in the final control element position to minimize wear.

It has been found that while the load-frequency control will attempt to respond to load changes such as are illustrated in FIG. 4 just as it would to a sustained change of the same magnitude, frequently a portion of the response occurs at a time which is too late to be in the proper phase. The response thus may enhance rather than decrease the oscillations set up by the periodically changing load, for while the load may increase at time $t1$ and then decrease back to its original value at time $t2$ the response time of the load frequency control and the generator governors may be such that the major part of the correction for this change in load would not occur until after time $t2$ in which case it would have an additive effect. There would be an increase in generation between the time $t2$ and the time $t3$ which would not be absorbed and instead of the control reducing the variations in frequency and/or the interchange with other areas, the control might cause the variations to be of even higher amplitude than those which would have been encountered had no control action been taken. This type of problem is one in which the magnitude and the periodicity of the load changes are known within reasonable limits, the form of the changes also being consistent.

Figure 5:
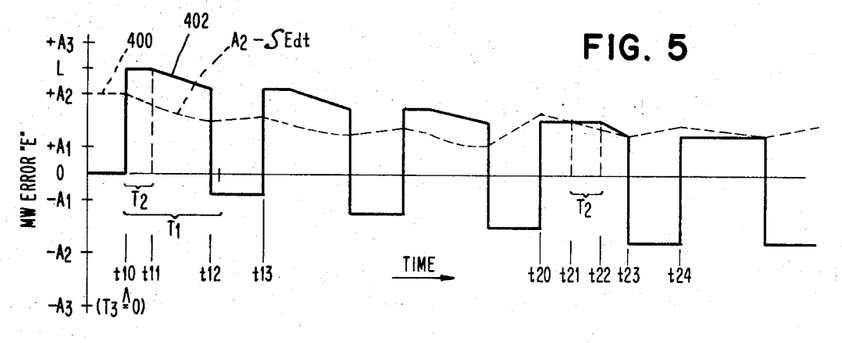
FIG. 5 is a waveform illustrating the operation of the circuit of FIG. 3 for process disturbances of the type illustrated in FIG. 4.

To prevent oscillation in response to the control action a filter circuit of the type illustrated in FIG. 3 may be utilized in the manner there shown, namely, as a means for either connecting or disconnecting the control. The beneficial aspects of the filter circuit of FIG. 3 as applied to this particular problem are illustrated in FIG. 5 which is a waveform diagram having the magnitude of the error signal plotted along the ordinate and time plotted along the abscissa. Each of the limit values A1, A2 and A3 are indicated for both the positive and negative values of error signal.

In FIG. 5 the time duration set for single-shot timer 156 of FIG. 3 is shown as being T1 which is greater than the expected period of time during which the load change persists thus the first section of the filter circuit will be ineffective in this particular case. It will also be noticed that none of the load changes cause the error to exceed the limit A3 in either a positive or negative direction and thus section 3 of the filter circuit 26 of FIG. 3 would be ineffective. However, since the time duration T2 as set on single shot timer 256 is less than the duration of the positive load change and since the load change itself causes the error signal to exceed the limit value +A2 the second section of the filter circuit of FIG. 3 would be effective to modify the action of the control. The dash-line 400 shown as starting from a point on the ordinate at +A2 represents the quantity A2 minus the time integral of the error signal or in other words the difference between the signal on line 220 and that on line 226. The solid line waveform 402 represents the error signal on line 102 of FIG. 3. This error signal at the time t10 rises to a value L corresponding to the maximum value shown in FIG. 4. Since the value L is above the limit value +A2 and assuming the signal on line 226 is initially zero the polarized relay 232 is energized to pull its movable contact 232A into contact with the upper stationary contact 232B thus connecting the input to the single-shot timer 256 to the source 150. The single-shot timer 256 after the period T2 has elapsed following energization of relay 232 produces an output signal on line 258 which energizes relay 260 pulling the movable contact 260A into contact with the lower stationary contact 260B thus completing the circuit between the source 150 and the relay 110 at the time t11. At that time the master controller 106 is effective to send "raise" signals on line 112 in response to the output on line 101 of area requirement instrument 100. The effect of these control signals in changing the generation in the area is shown by the decreasing magnitude of the area requirement or error signal shown by the solid line 402 in FIG. 5 between the time t11 and t12.

Since the time t12 occurs before the end of the period T1 after the time t10 there is no utilization of section 1 of the filter circuit of FIG. 3 as previously mentioned. After time t12 the error signal goes negative by an amount corresponding with the effect of the control action on the positive magnitude of the error signal just before t12.

It will be noted that during the time period t10 to t11 the signal on line 226 which represents the value corresponding to the integral of the error signal has the effect of steadily decreasing the effective magnitude of the limit value +A2. After the time t11 and up to the time t12 the dash-line 400 representing the signal on line 220 minus that on 226 has a constantly decreasing slope as the error signal decreases as a result of the control action. During the period between t12 and t13 the integrated error signal goes negative and thus the dash-line 400 representing the modified limit +A2 shows an increasing value.

A similar operation of the filter circuit and the associated control circuit occurs during the subsequent positive excursions of the error signal up to the time t20. It will be noted that at time t20 the positive excursion of the error signal is not sufficient to cause it to exceed the magnitude of the quantity A2 minus the time integral of the error signal, therefore the relay 232 is not actuated at time t20 but is instead actuated at time t21 when the error signal starts to exceed the quantity A2 minus the integrated error signal. Thus, at the time t21 single shot timer 256 will be energized and will produce an output signal at time t22, after the period T2, so that between time t22 and t23 the control system is effective to increase the generation and reduce the error signal.

In the next positive excursion of the error signal after time t24 the error signal does not exceed at any time the quantity A2 minus the integrated error signal and therefore there is no control action taken during that period. After the time t24 the area under the positive excursions of the error signal is equal to the area under the negative excursions, thus subsequent cycles of the load will be treated the same as the cycle just following t24. No control action will be taken since the control action which has been effected previously has established the optimum generation for the area. Since the generation cannot be varied to effectively follow the load changes the control action is effective to establish a generation in the area which would cause the excursions of the error signal both positive and negative to represent the same amount of energy.

Figure 6:
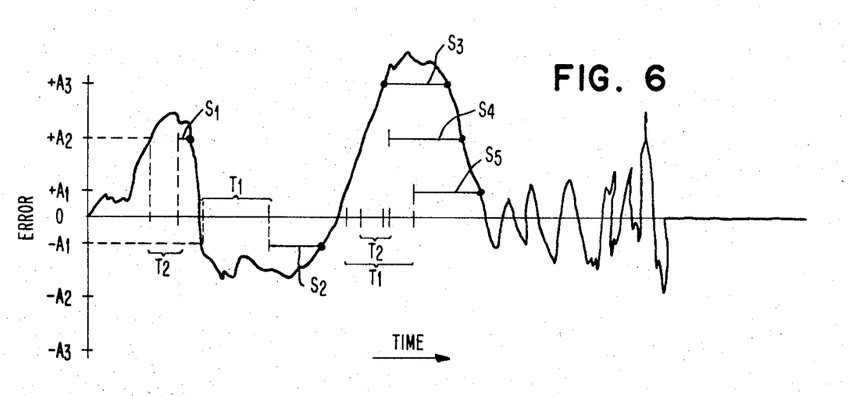
FIG. 6 is a waveform showing how the circuit of FIG. 3 would operate in response to a random disturbance.

In some process controls the disturbances are of a random nature and therefore the error signal may have a wave shape such as that shown in FIG. 6 wherein the values A1, A2 and A3 are indicated along the ordinate as representatives of the error limits established in the filter circuit of FIG. 3. The abscissa is shown as being time and the error signal is plotted as a solid line 404.

For ease of description we may assume that with reference to FIG. 6 the integrating circuit 128 of FIG. 3 is assumed to have been omitted. During the initial positive excursion of the error signal shown in FIG. 6 it does not exceed the amplitude +A1 for a period equivalent to T1, therefore the first section of the filter circuit of FIG. 3 would not be effective. Likewise, the amplitude of the error does not exceed the value +A3 during the first positive excursion and the third section of the filter circuit is not effective. The error does, however, exceed the amplitude +A2 for a period greater than T2 during the first positive excursion. Therefore, for the time indicated by the segment S1, control action would be taken as a result of the operation of section 2 of the filter circuit which would connect the lines 50 and 51.

In the next portion of the waveform the negative excursion exceeds the amplitude −A1 for a time period in excess of T1 so as to cause the first section of the filter circuit to be effective to connect the lines 40 and 41 as a result of the energization of relay 200 and relay 160. Thus, the time duration shown by the segment S2 represents the period during which control action is taken to reduce the error signal to zero.

During the next following positive excursion of the error signal each of the sections of the filter is effective for different time periods. Section 3 becomes effective immediately upon the error signal attaining the value +A3 and continues to be effective until it decreases below the value +A3 as shown by the segment S3 which indicates the duration of time over which the relay 332 would be energized to connect lines 60 and 61.

Segment S4 indicates the time period over which relay 232 and relay 260 would be energized to connect lines 50 and 51 and segment S5 shows the time period over which relay 132 and relay 160 will be energized to connect lines 40 and 41.

Those portions of the waveform of FIG. 6 following the second positive excursion of the error signal are of such high frequency that the time periods T1 and T2 are never exceeded when the respective amplitudes A1 and A2 are exceeded therefore neither the first nor the second section of the filter circuit of FIG. 3 is effective. Also, since the amplitude of the error does not attain a value A3 the third section is not effective and no control action is taken during those high frequency excursions. There will therefore be no tendency for the control to cause the excursions to be more extensive by causing a control action which will not be effective in reducing the error signal.

The previous description of FIGURE 6 as mentioned has ignored the effect of the integrator 128 for the purposes of simplifying the description. It will be evident that such an integrator would normally be used and the integration would modify the effective value of the various limit amplitudes A1, A2 and A3 as was demonstrated in FIGURE 5. In processes where the measured variable does not have a tendency to deviate significantly from its desired value for a long period the need for the integration circuit 128 would, of course, be decreased but where there is a tendency for the error to be on one side or other of the zero value, the integration circuit 128 is effective to improve the control action.

The filter circuit 26 of FIG. 3 may be substituted for the block 26 of FIG. 1 with the relay 24 of FIG. 1 corresponding effectively to relay 110 of FIG. 3 and line 18 of FIG. 1 corresponding to line 108 of FIG. 3. Likewise, the filter circuit 26 of FIG. 3 can be substituted for block 26 of FIG. 2 and the several output lines 40, 41, 50, 51, 60 and 61 of FIG. 2 can be considered as corresponding to similarly numbered output lines of FIG. 3. Thus, the filter circuit of FIG. 3 may be used in any of a number of arrangements wherein the control action of a controller is modified in accordance with an error signal. For instance, relay 24 could be utilized to disconnect line 34 instead of line 18 in FIG. 1. Also, in FIG. 3 relay 110 could be used to disable the fringe action in a load-frequency control circuit which includes both sustained and fringe response. Such a load-frequency control circuit is described in U.S. Patent 2,692,342 issued to C. Nichols et al. on Oct. 19, 1954. In FIG. 3A of the Nichols et al. patent, for example, the output of transmitter 231 could be disconnected by a relay such as 110 of the present FIG. 3.

It will be evident to those skilled in the art that the filter circuit of FIG. 3 is merely one arrangement which would be useful for obtaining the type of operation described and that there are many other circuit arrangements which can be utilized to obtain a similar mode of operation. Some of the possible variations in the filter circuit of FIG. 3 are shown in FIGS. 7 and 8 which are described subsequently.

In some applications of the present invention it may be desirable to have some if not all of the several sections of the filter circuit 26 in FIGURE 2 include more than a single timer such as the single-shot 156 in section 1 as shown in FIGURE 3. In FIGURE 7 there has been illustrated a modified diagram of the circuit of section 1 in FIGURE 3. FIGURE 7 shows each of the elements shown in section 1 of FIGURE 3 with the same elements being identified by like reference characters. In FIGURE 7 line 41 is connected to operate relay 46 which is comparable to relay 46 of FIGURE 2. Another relay 446 has been added and it is the function of the circuit of FIGURE 7 to cause the relay 446 to be energized only after the error signal E has been beyond the limit value set by the knob 182B for a period of time as set in the single-shot 456, which time may be desirably longer than that set in single-shot 156.

Figure 7:
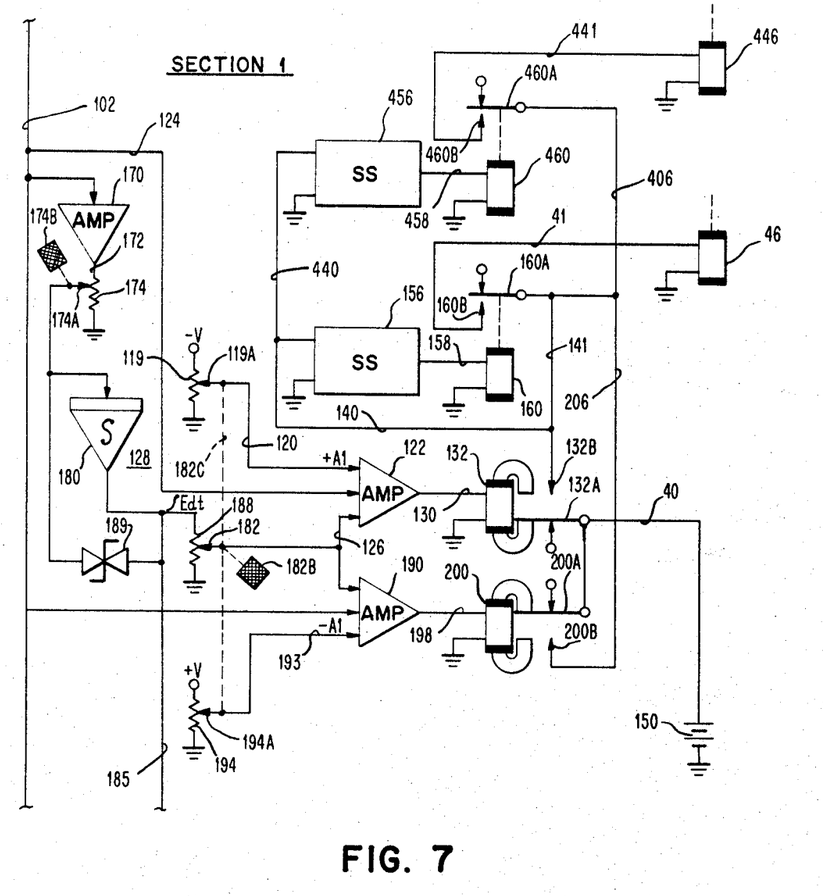
FIG. 7 is a schematic diagram of variation of the circuit of section #1 of FIG. 3.
Figure 8:
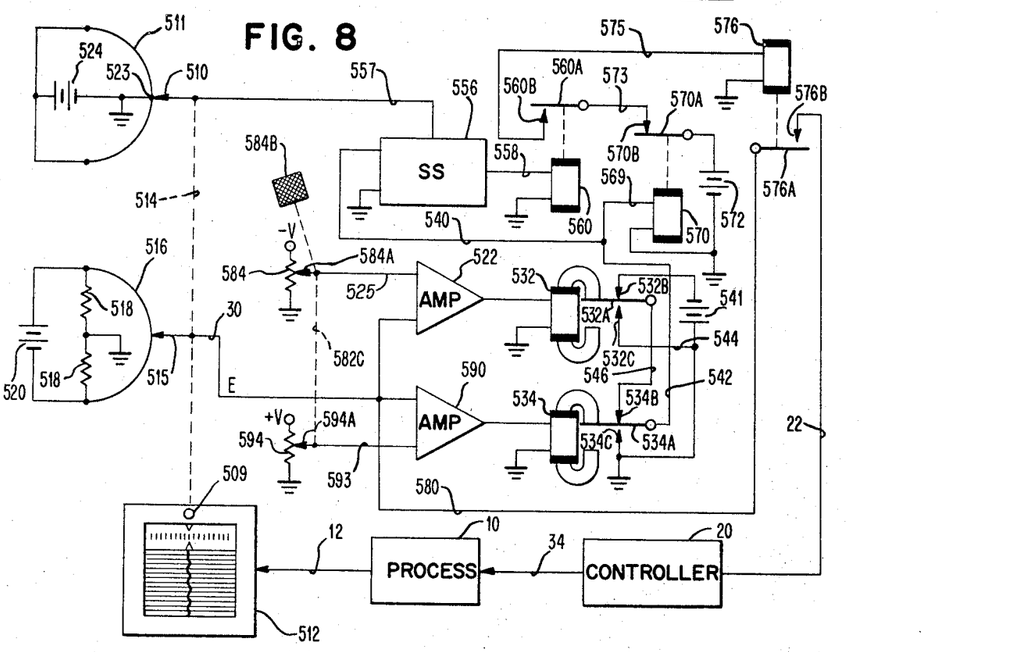
FIG. 8 is a schematic diagram of a modified filter circuit showing its application to a process control system.

As is evident from FIGURE 7, the signal which appears on line 140 when the error signal exceeds the limit setting is not only connected to operate the single-shot timer 156 but also is connected by line 440 to single-shot timer 456. This signal appearing on line 140 therefore is effective by way of its connection through line 440 to initiate the timing cycle of single-shot timer 456 so that an output signal is produced by the single-shot timer 456 on its output line 458 after the set period of single-shot timer 456 has expired. The appearance of the signal on line 458 is effective to energize relay 460 causing its movable contact 460A to be connected to the lower stationary contact 460B. Upon connection of the contact 460A and contact 460B battery 150 causes a current flow through line 40, contact 132A or contact 200A and contact 132B or contact 200B and through line 406, contacts 460A and 460B and line 441 to energize relay 446.

It is desirable that the incorporation of an additional timing circuit as described for FIGURE 7 should be utilized to effect a different modification of the control of the process depending upon the duration of the period during which the error signal exceeds the preset limit value for each particular section of the filter circuit. Thus while the energization of relay 46 may be effective to increase the gain by a certain amount as occurs in the circuit of FIG. 2 where the single-shot timer 456 FIGURE 7 is set to have a longer time period the relay 446 should be connected to further increase the gain of the control system over that gain which is effected when only relay 46 is energized.

While a process control system may incorporate a filter circuit such as that shown in FIGURE 2 so that there is a minimum gain in the control circuits even when the error signal has not exceeded any of the preset limit values of the filter circuit 26 this minimum gain may be necessarily of such a value that certain process disturbances will nevertheless result in the error signal remaining uncorrected after a long period of time. In order to prevent such an occurrence it may be desirable that one section of the filter should be adjusted so that the limit value will be effectively zero. This may be accomplished with the circuit of FIG. 7 by the adjustment of knob 182B so that the contacts 119A and 194A respectively are at the lowermost point on the respective potentiometer elements 119 and 194, thus connecting the lines 120 and 193 to ground. At the same time the contact 182 will be adjusted to the lowermost point on the potentiometer 188 to effectively connect lines 126 to ground and thus remove the effect of the integrator 128.

FIGURE 8 shows a modified arrangement which may be utilized as a filter circuit in many types of process control. Instead of incorporating a plurality of limit values and a single time period associated with each of those values or a plurality of limit values and a plurality of time periods associated with each of the limit values, FIGURE 8 shows the utilization of a single limit value setting which may be made by knob 584B and a continuously variable time period which is automatically set into the single-shot 556 by the change in the signal on line 557.

As shown in FIGS. 1 and 2, the controller 20 is operable in response to a signal on line 22 and produces an output 34 which is effective to control a manipulated variable of the process 10 so as to tend to reduce the deviation of the magnitude of the measured variable which appears on line 12 so that the magnitude of the measured variable will more closely approximate the magnitude of the set point as established by adjustment of the front setter knob 509 on recording instrument 512. The recording instrument 512 may be any of a number of well known recorders which produce a rotation of a shaft such as shaft 514 in dependence upon the deviation of the measured variable from the set point.

The rotation of the shaft 514 is effective to modify the positioning of the slidewire contact 515 on the control slidewire 516. Since the control slidewire 516 is effectively center tapped by the use of the ground connection interposed between the like valued resistors 518 in combination with the shunting battery 520, movement of the slidewire contact 515 from its central position on slidewire 516 is effective to modify in either a positive or a negative direction the magnitude of the error voltage E which is carried on connecting line 30. As is usually the case the slidewire 516 is coupled to the front setter knob 509 so that it is oriented with respect to the contact 515 by movement of the front setter knob 509. For simplicity this connection is not shown in FIG. 8.

The shaft 514 also is connected to rotate the slidewire contact 510 associated with slidewire 511. As shown in FIG. 8 the slidewire 511 is tapped at its midpoint by the tap 523. This center tap is connected to ground and also to the negative side of battery 524 with the positive side of the battery 524 being connected to each of the ends of the slidewire 511.

In FIG. 8 the appropriate limit values are set by the adjustment of knob 584B which is effective through its mechanical coupling 582C between the movable contacts 584A and 594A to modify the potentials at those contacts as tapped from the associated potentiometer wires 584 and 594. As with the similar provisions for setting the limit values in the various sections of the filter circuit of FIG. 3 the potentiometers 584 and 594 are in circuit between a potential —V and +V, respectively, and ground potential. The contact 584A is coupled through line 525 to an input to amplifier 522 while the contact 594A is coupled through line 593 to amplifier 590. The operational amplifiers 522 and 590 are high gain comparators which are effective to compare the respective values introduced on lines 525 and 593 with the value of the error signal which appears on line 30 which connects to both amplifiers 522 and 590.

Amplifier 522 is effective to energize polarized relay 532 which is coupled to its output circuit whenever the error signal E exceeds in a positive direction its limit value as set on potentiometer 584. Upon such an occurrence the movable contact 532A is disconnected from the upper stationary contact 532B and is connected to the lower stationary contact 532C. With such a connection the grounded side of battery 541 is connected to line 540. The grounded side of the battery 541 is coupled by way of line 544, contact 532C, contact 532A, line 546, and the upper stationary contact 534B and movable contact 534A to line 540. Line 540 is one of the input connections to the single-shot timer 556. The other input connection is a ground connection. Thus output of the single-shot timer on line 558 would also be at ground potential until the duration of the set time period for the single-shot 556 has elapsed. It will be evident that if the measured variable should deviate in a negative direction from the set point then if the error signal would be negative and if the error signal is sufficiently negative as it appears on line 30 to exceed the value set by the adjustment of contact 594A on potentiometer 594 then the amplifier 590 will energize polarized relay 534 so as to cause the movable contact 534A to be moved from contact with its upper stationary contact 534B to contact with its lower stationary contact 534C. The contact 534C being connected to ground, the effect of the energization of the polarized relay 534 is to make a ground connection to line 540 as was the case with the energization of the polarized relay 532 by the amplifier 522.

When relay 534 and relay 532 are both in a deenergized state then the negative potential of battery 541 is connected by way of the upper stationary contact 532B, movable contact 532A, line 546, upper stationary contact 534B and movable contact 534A, to connect to line 540 whereby the output of the single shot timer 556 on line 558 is likewise at a comparable negative potential causing energization of the relay 560 which has its other input connection made to ground as shown in FIG. 8. Upon energization of relay 560 the movable contact 560A is moved into contact with the lower stationary contact 560B. This connection between 560A and 560B is continually effective except when the error signal on line 30 exceeds the preset limit value as set by the knob 584B.

Whenever the line 540 is at a negative potential as established by the deenergized condition of relay 532 and relay 534 and the potential on battery 541, this negative potential also appears on line 569 to energize relay 570 which has its other input connected to ground. When relay 570 is energized its movable contact 570A is pulled away from the upper stationary contact 570B so that the potential which appears on battery 572 is decoupled from its normal connection through line 573 to movable contact 560A. It will be evident from FIG. 8 that the relays 560 and 570 are effective to cause a current to be introduced by way of battery 572 to line 575 which is effective to energize relay 576 during those periods when relay 560 is energized and relay 570 is deenergized. Relay 576 is deenergized when relay 560 is deenergized or when relay 570 is energized.

Figure 9:
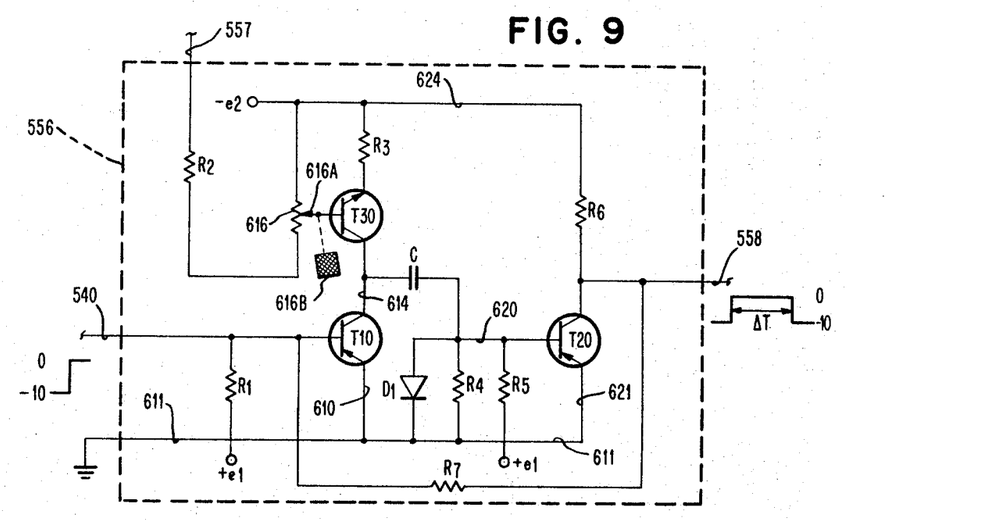
FIG. 9 is a schematic diagram of a single-shot timer which can be used in carrying out the various forms of this invention.

An appropriate type of circuit which may be utilized for the single-shot timer 556 is shown in FIG. 9 and will be described subsequently. For the present description with regard to FIG. 8, it is sufficient to note that the single-shot timer 556 is constructed to respond to a positive going change of voltage on its input line 540 as for example when the line 540 goes from a —10 volt potential to zero volts or ground potential. Upon occurrence of such a change at the input line 540 the output line 558 of the single-shot timer 556 also goes from a —10 volt potential to a zero volt potential and it stays at the zero or ground potential for the duration of the period set for the timer by the signal which appears on line 557. At the end of that period the potential on line 558 returns to the —10 volt potential which is then effective to again energize relay 560. It will thus be evident that before the appearance of the positive going voltage change on the input line 540 the relay 560 is energized. The relay 560 is then deenergized upon appearance of the positive going input and remains deenergized for the duration of the set period for the timer after which time it is again energized. As previously mentioned the set duration for the single-shot timer 556 may be dependent upon the magnitude of the potential appearing on line 557 which will become more clear in the subsequent explanation of FIG. 9. Thus the single-shot timer 556 is one which is continuously variable as to time duration and as shown in FIG. 8 this variation is in accordance with the magnitude of the error signal E. To accomplish this variation the line 557 is connected to the movable contact 510 and slidewire 511 so that the potential on line 557 will vary from a ground potential whenever the error signal E is equal to zero to some positive potential corresponding with the potential of battery 524 whenever the contact 510 is at one of its extreme positions on the slidewire 511 as would be the case when the error signal is at a maximum in either a plus or minus direction.

In summary it will be evident from the previous explanation that the energization of the relay 576 is dependent upon the error signal exceeding the preset limit setting in either a positive or negative direction for a duration of time which is itself dependent directly upon the magnitude of the error signal E.

When relay 576 is energized the error signal E appearing on line 30 is connected by way of line 580 through the movable contact 576A to the stationary contact 576B of relay 576 which connects the error signal E to line 22, the input line to controller 20. Thus the control is effective during the energization of the relay 576 to effect the desired control on the process 10 so as to tend to reduce the deviation of the measured variable which appears on line 12 toward the set point as established by the adjustment of knob 509.

It is generally desirable that the period for which the single-shot 556 is set should be decreased with an increase in the magnitude of the error signal appearing on line 30 so that increasingly great deviations of the measured variable from the set point are required to be present for shorter durations of time before the controller 20 is coupled to line 580 by way of its input line 22 so that effective control may be executed.

The circuit of FIG. 9 illustrates one type of circuit which may be utilized for the single-shot 556 in FIG. 8. The single-shot circuit may, of course, take other forms depending upon the requirements for the external circuitry to which it is connected. It should also be noted that the single-shot circuit of the type shown and described in connection with FIG. 9 may be utilized in the single-shot 156 and 256 of FIG. 3 with suitable variations in the external circuitry to accommodate the magnitudes and polarities of the input and output signals.

In FIG. 9 the input line 540 is coupled to the base of transistor T10 and as previously mentioned the input signal introduced by way of line 540 is a positive going change of potential which may, for example, go from −10 volts to zero volt. When the input line 540 is at a −10 volt potential the pnp transistor T10 is in its normal "on" condition. Its emitter electrode is coupled by way of line 610 and 611 to a ground connection while the collector electrode is coupled to be at a negative bias potential by virtue of its coupling through the transistor T30 as subsequently explained. The base electrode of transistor T10 is connected through resistor R1 to bias potential +e1 and its collector is connected by way of line 614 to the collector of the npn transistor T30.

The emitter of transistor T30 is coupled by way of resistor R3 to a potential −e2 which provides a sufficient negative bias to cause transistor T30 to be "on" when its base is connected as shown to the movable contact 616A of potentiometer 616. Contact 616A may be adjusted by knob 616B so that the bias of the base connection of T30 is at an adjustable positive potential compared with its emitter. Potentiometer 616 and resistor R2 are connected serially between line 557 and the −e2 bias potential source.

The potential which automatically modifies the time duration of the single-shot timer of FIG. 9 is introduced on line 557 as a variable positive potential and it is effective to modify the potential established at the base of transistor T30 by altering the current through potentiometer 616. The current drawn by the transistor T30 is directly related to the potential of its base with respect to its other elements and therefore the current through transistor T30 is modified in accordance with not only the setting of the knob 616B but also directly in accordance with the signal introduced on line 557. By virtue of the fact that the transistor T30 is maintained in the "on" state the negative potential −e2 on the emitter is effective to establish a negative potential on the collector of transistor T30 and by virtue of the connection by way of line 614 the collector of transistor T10 is held at the same negative potential.

Shunted across transistor T10 is the series connected capacitor C and a parallel combination of resistor R4 and diode D1 with the diode being poled so that its cathode is connected to the ground connection 611 as is one side of the resistor R4. The other sides of resistor R4 and diode D1 are connected by way of line 620 to the base electrode of transistor T20. The base electrode is also connected through resistor R5 to a bias potential source +e1.

The emitter of transistor T20 is connected by line 621 to the ground connection 611 while the collector of transistor T20 is connected through resistor R6 to the negative potential source −e2 by way of line 624. The collector of transistor T20 is also connected to the output line 558 and by way of resistor R7 to the base electrode of transistor T10.

When transistor T10 is "on" as in its normal state prior to the introduction of an input signal on line 540, the collector of transistor T10 is effectively held at ground and the base of transistor T20 is slightly above ground by virtue of the current through R4 and R5 due to the +e1 source. Thus the transistor T20 is normally in the "off" condition and the current flowing through transistor T10 also flows through transistor T30 and capacitor C is maintained in a discharge state. When the positive going input appears on line 540 the transistor T10 is turned off and the current drawn by the transistor T30 is drawn through capacitor C so that the base of transistor T20 is then coupled to have a negative potential sufficient to bias the transistor T20 to the "on" condition.

Upon the turning off of transistor T10 and the turning on of transistor T20 the capacitor C begins to charge by the flow of current through R4. When the capacitor has become fully charged the required bias potential on the base of transistor T20 is no longer present and transistor T20 is then shut off and the output line of 558 which during the charging of the capacitor was maintained at a ground potential by the conduction of transistor T20 then again goes to the same negative potential which was present before the input signal on line 540 appeared. This negative going change of voltage on output line 558 appears at a time after the positive going input on line 540 which depends upon the setting of knob 616B and the signal introduced on line 557.

The several components of the circuit of FIG. 9 may desirably be of the following types and values for operation as above described:

| Resistors: | Ohms |
|---|---|
| R1 | 56,000 |
| R2 | 3,900 |
| R3 | 2,700 |
| R4 | 1,000 |
| R5 | 47,000 |
| R6 | 12,000 |
| R7 | 12,000 |
| Potentiometer 616 | 5,000 |

| Transistors: | Type |
|---|---|
| T10 | 2N404 |
| T20 | 2N404 |
| T30 | 2N697 |

| Potential source: | Voltage |
|---|---|
| e1 | +6 |
| e2 | −20 |

It will be evident to those skilled in the art that the disclosed apparatus may take any of a number of different forms as analog apparatus or may alternatively take the form of an equivalent digital apparatus which is capable of carrying out the same method.

What is claimed is:

1. In a process control system for controlling a manipulated variable of the process in response to an error signal representing the deviation of a measured variable from a predetermined set point the improvement which comprises
   means for establishing a plurality of limit signals each representing a limit value for said error signal,
   means for establishing a time period variable in accordance with said error signal,
   means responsive to said error signal and to said limit signals for altering the response of said control system to said error signal when said error signal has exceeded said limit signals for said variable time period.

2. In a process control system for controlling a manipulated variable of the process in response to an error signal representing the deviation of a measured variable of the process from a predetermined set point the improvement which comprises
   means for establishing a plurality of limit signals each representing a different limit value for said error signal,
   separate means each responsive to a different one of said limit signals and to said error signal to produce a corresponding actuating signal for each of said limit signals which is exceeded by said error signal,
   separate timing means responsive to each of said actuating signals and operative to produce an energizing signal during that period of said actuating signal following a predetermined time period uniquely associated with the corresponding limit signal, means responsive to the coincident production of both an actuating signal and an energizing signal associated with one of said limit signals for altering the response of said control system to said error signal.

3. In a process control system for controlling a manipulated variable of the process in response to an error signal representing the deviation of a measured variable of the process from a predetermined set point the improvement which comprises means for establishing a plurality of limit signals, each representing a different value for said error signal, means for establishing for each limit signal a modifying signal varying in accordance with the integral of said error signal separate means each responsive to the difference between a different one of said preset signals and its associated modifying signal and to said error signal to produce an associated actuating signal when said error signal exceeds said difference, separate timing means responsive to each of said actuating signals and operative to produce an energizing signal during that period of said actuating signals following an associated predetermined time period, said time periods each being uniquely associated with one of said limit signals, means responsive to the coincident production of an actuating signal and an energizing signal for altering the response of said control system to said error signal.

4. In a process control system for controlling a manipulated variable of the process in response to an error signal representing the deviation of a measured variable of the process from a predetermined set point, the improvement which comprises means for establishing the plurality of limit signals, each representing a different limit value for said error signal, means for establishing a modifying signal varying in accordance with the integral of said error signal, separate means each responsive to the difference between a different one of said limit signals and said modifying signal and to said error signal to produce an actuating signal when said difference is exceeded by said error signal, timing means responsive to said actuating signals and operative to produce an energizing signal during that period of said actuating signals following an associated predetermined time period signal, means responsive to the coincident production of an actuating signal and an energizing signal associated with one of said limit signals for altering the response of said control system to said error signal.

5. A process control system comprising means for producing a signal indicative of a measured variable control means for producing a control signal having a predetermined proportional response to the deviation of said measured variable signal from a desired value, means responsive to said control signal for effecting a corresponding control of the manipulated variable so as to tend to reduce said deviation to zero, filter means outside the control loop which is formed by the combination of the above mentioned means, said filter means being operative to modify the response of said control means to said deviation when said deviation has exceeded a predetermined limit value for a predetermined time period, the setting of said limit value and said time period being determined by the response characteristics of the said process control system.

6. A process control system comprising means for producing a signal indicative of a measured variable control means for producing a control signal having a predetermined proportional response to the deviation of said measured variable signal from a desired value, means responsive to said control signal for effecting a corresponding control of the manipulated variable so as to tend to reduce said deviation to zero, filter means outside the control loop which is formed by the combination of the above mentioned means, said filter means being operative to modify the proportional relationship of said control signal to said deviation when said deviation has exceeded a predetermined limit value for a predetermined time period, the setting of said limit value and said time period being determined by the response characteristics of the said process control system.

7. A process control system comprising means for detecting the deviation of a measured variable of said process from its set point to produce an error signal, control means responsive to said error signal for changing the magnitude of a manipulated variable of said process to tend to reduce said deviation of said measured variable, means for establishing a plurality of predetermined conditions each of which represents a different combination of at least one predetermined magnitude of said error signal and at least one predetermined time period during which said error signals must continuously exceed an associated one of said predetermined magnitudes of said error signal, means responsive to said error signal for modifying the response of said control means to said error signal when said error signal exceeds one of said plurality of predetermined conditions.

8. A process control system comprising means for detecting the deviation of a measured variable of said process from its set point to produce an error signal, a control means responsive to said error signal for changing the magnitude of a manipulated variable of said process to tend to reduce said deviation of said measured variable, means for establishing a plurality of predetermined conditions each of which represents a different combination of at least one predetermined magnitude of said error signal and at least one predetermined time period during which said error signals must continuously exceed an associated one of said predetermined magnitudes of said error signal, means responsive to said error signal for selectively modifying the response of said control means to said error signal when said error singal exceeds any one of said plurality of predetermined conditions, said modification being of amount related to the particular condition exceeded.

9. A process control system comprising means for producing an error signal indicative of the deviation of a measured variable of the process from its set point, means responsive to said error signal and coupled to the process being controlled to form a control loop therewith, means outside said control loop for modifiying said control loop so as to modify a characteristic of said response when said error signal meets a predetermined condition established as a joint function of the magnitude and duration of said error signal.

10. A process control system comprising means for producing an error signal indicative of the deviation of a measured variable of the process from its set point, means responsive to said error signal and coupled to the process being controlled to form a control loop therewith, means outside said control loop for modifying said control loop so as to modify a characteristic of said response when said error signal meets a predetermined condition established as a joint function of a set limit value for said error signal and a duration for said error signal.

11. A process control system comprising means for producing an error signal indicative of the deviation of a measured variable of the process from its set point, means responsive to said error signal and coupled to the process being controlled to form a control loop therewith, means outside said control loop for modifying said control loop so as to modify a characteristic of said response when said error signal meets a predetermined condition established as a joint function of one of a plurality of limit values for said error signal and a corresponding time period during which said error signal is beyond the associated limit value.

12. The method of controlling a process which comprises the steps of producing a first signal corresponding to the magnitude of a process variable, producing a second signal corresponding to a set point value for said process variable, producing an error signal in accordance with the difference between said first and second signals, producing a change in magnitude of a manipulated variable of said process in accordance with a variable function of said error signal, said function being dependent upon which of a plurality of different conditions is met by said error signal, each of said conditions representing at least one set magnitude of said error signal and at least one time period during which the error signal must at least equal said set magnitude.

13. The method of controlling the process which comprises the steps of producing a first signal corresponding to the magnitude of a process variable, producing a second signal corresponding to a set point value for said process variable, producing an error signal in accordance with the difference between said first and second signals, producing a change in magnitude of a manipulated variable of said process in accordance with a variable function of said error signal, said function being dependent upon which of a plurality of different conditions is met by said error signal, each of said conditions representing one of a plurality of set magnitudes of said error signal and one of a plurality of time periods during which the error signal must at least equal the corresponding one of said set magnitudes.

14. The method of controlling the process which comprises the steps of producing a first signal corresponding to the magnitude of a process variable, producing a second signal corresponding to a set point value for said process variable, producing an error signal in accordance with the difference between said first and second signals, producing a change in magnitude of a manipulated variable of said process in accordance with a variable funciton of said error signal, said function being dependent upon which of a plurality of different conditions is met by said error signal, each of said conditions representing the same set magnitude of said error signal and one of a plurality of time periods during which the error signal must at least equal said set magnitude.

References Cited

UNITED STATES PATENTS 3,286,144  11/1966  Hill _________________ 318—18

BENJAMIN DOBECK, *Primary Examiner.*

U.S. Cl. X.R.

318—28; 235—151.1